United States Patent [19]

Otani et al.

[11] Patent Number: 5,357,539

[45] Date of Patent: Oct. 18, 1994

[54] LASER OSCILLATING APPARATUS WITH MIRROR ANGLE ADJUSTMENT

[75] Inventors: Akihiro Otani; Satoshi Nishida; Masaki Kuzumoto; Tetuya Endo, all of Aichi, Japan

[73] Assignee: Mitsubishi Denki Kabushiki Kaisha, Tokyo, Japan

[21] Appl. No.: 955,060

[22] Filed: Oct. 1, 1992

[30] Foreign Application Priority Data

Oct. 1, 1991 [JP] Japan ................................. 3-253717

[51] Int. Cl.⁵ ...................... H01S 3/086; H01S 3/04; G02B 5/10
[52] U.S. Cl. ...................................... 372/107; 372/35; 372/93; 372/103; 359/845
[58] Field of Search ...................... 372/107, 14, 15, 35, 372/29, 34, 93, 103; 359/845

[56] References Cited

U.S. PATENT DOCUMENTS

| | | | |
|---|---|---|---|
| 3,904,983 | 9/1975 | Moreno et al. | 372/93 |
| 4,672,626 | 6/1987 | Koseki | 372/107 |
| 4,760,581 | 7/1988 | Hoag | 372/61 |
| 4,872,179 | 10/1989 | Nitsche et al. | 372/103 |

FOREIGN PATENT DOCUMENTS

| | | |
|---|---|---|
| 3807709 | 3/1988 | Fed. Rep. of Germany . |
| 3900467 | 1/1989 | Fed. Rep. of Germany . |
| 60-254684 | 12/1985 | Japan . |
| 0124275 | 5/1989 | Japan ..................................... 372/93 |

*Primary Examiner*—Rodney B. Bovernick
*Assistant Examiner*—Robert McNutt
*Attorney, Agent, or Firm*—Sughrue, Mion, Zinn, Macpeak & Seas

[57] ABSTRACT

A laser oscillator comprising a laser resonator having a plurality of mirrors for directing the laser energy from source to exit apertures, the mirrors being constructed and mounted adjustably for reducing parasitic oscillations. The mirrors are mounted in adjusting members that have channels therein for coolant and are provided with heat insulating members that minimize heat gradients and unwanted heat transfers that may result in the distortion of the reflecting surfaces. In addition, the mirrors are angled so that light paths are defined that present a Z-shaped turning pattern. Apertures proximate to the mirrors through which the light beams are directed are offset from a common plane so that a reflective surface is not within the aperture of the opposing reflective surface. One or more of the apertures can be so offset to reduce the possibility of parasitic oscillations. Further, the reflectors can be angled and the apertures sized so as to eliminate parasitic oscillations.

12 Claims, 10 Drawing Sheets

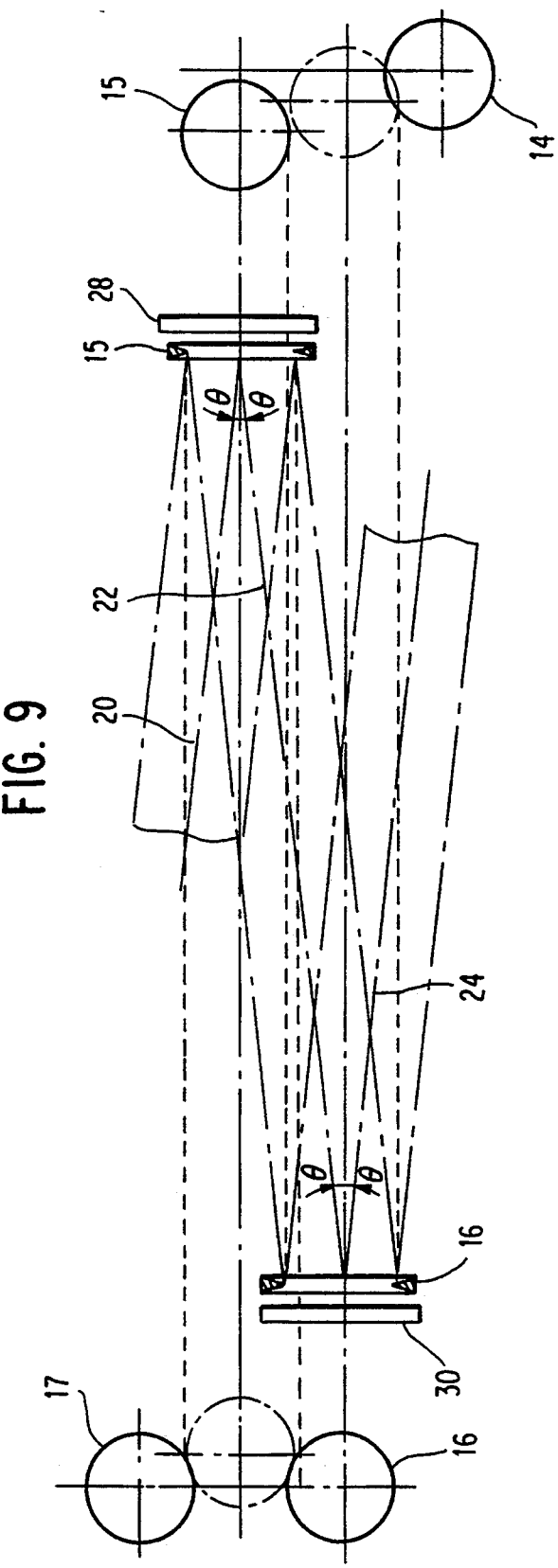
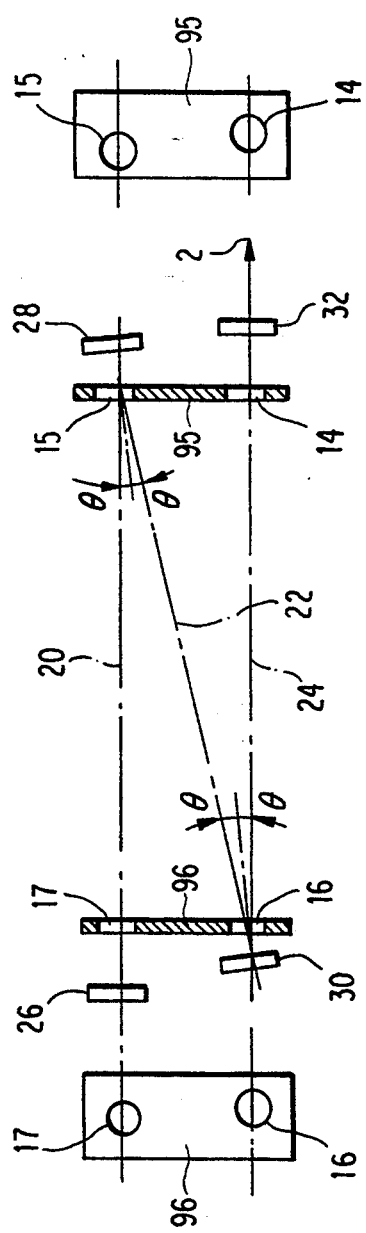
FIG. 9
FIG. 10

LASER OSCILLATING APPARATUS WITH MIRROR ANGLE ADJUSTMENT

BACKGROUND OF THE INVENTION

1. Field of the Invention

The present invention relates to a laser oscillating apparatus and particularly to a laser oscillating apparatus designed to stabilize the pointing of a laser beam.

2. Description of the Background Art

FIGS. 21 and 22 are perspective views illustrating the arrangement of, for example, a laser oscillating apparatus of the background art disclosed in Japanese Patent Disclosure Publication No. 254684 of 1985. Referring to FIG. 22, the numeral 10 indicates an enclosure for enclosing a laser medium gas, 4 a pair of discharge electrodes, 8 a heat exchanger, 6 a blower, 26, 28 and 30 total reflectors, 32 a partial reflector, 12a first laser beam reflecting unit including the partial reflector 32 and total reflector 28, 12b second laser beam reflecting unit including the total reflectors 26 and 30, and 2 a laser beam. FIG. 23 shows a cross section of the first laser beam reflecting unit 12a, wherein 14 and 15 indicate apertures disposed in aperture member 95 immediately before the partial reflector 32 and total reflector 28, respectively, 36 an optical base for holding the first laser beam reflecting unit 12a, 44 a connecting rod for connecting the optical base 36 and an optical base for the second laser beam reflecting unit 12b, 54 bellows on which the enclosure 10 and optical base 36 are installed to maintain vacuum and airtightness, 38 an optical board installed on the optical base 36, and 40 and 42 adjusting plates mounted with the total reflector 28 and partial reflector 32 for adjusting the angles of the total reflector 28 and partial reflector 32, respectively.

FIGS. 24 and 25 illustrate the optical board 38 and an angle adjusting mechanism of the adjusting plate 40 installed on the optical board 38. FIG. 24 is a side view and FIG. 25 is a sectional view taken along the plane 25—25 of FIG. 24. In FIGS. 24 and 25, 46 indicates adjusting screws for adjusting the angle of the adjusting plate 40, 47 a threaded portion where the adjusting screw 46 is threaded into the optical board 38, 48 an O ring for vacuum-sealing and simultaneously holding the adjusting screw 46 rotatably against the optical board 38, 49 a receiving member provided on the adjusting plate 40 to make contact with the end of the adjusting screw 46, 55 a spring disposed to pull the adjusting plate 40 toward the optical board 38, 50 a support provided on the adjusting plate 40, 56 coolant flowing in the adjusting plate 40, 58 tubes in which the coolant 56 flows, 51a and 51b holes formed in the optical board 38 to permit a flow of the coolant 56, and 52 joints for connecting the tubes 58, optical board 38 and adjusting plate 40.

The operation of the laser oscillating apparatus arranged as described above will now be described.

FIG. 26 is a vertical sectional diagrammatic view in the longitudinal direction of the oscillating apparatus including the resonator light paths of the laser oscillating apparatus described in FIG. 22. Referring to FIGS. 26 and 22, the pair of discharge electrodes 4 for generating discharge and exciting the laser medium gas, the blower 6 for circulating the laser medium gas, and the heat exchanger 8 for cooling the laser medium gas are disposed in the enclosure 10 as described previously, and the laser medium gas passes between the pair of discharge electrodes 4 and is excited to be ready for laser oscillation. The laser medium gas then enters the heat exchanger 8, is cooled there, passes through the blower 6, and circulates in the direction of an arrow A. In the meantime, three resonator light paths pass an excitation area 18, where the laser medium gas is excited by discharge, in a Z pattern. The three parts are formed by resonator mirrors, comprising the total reflectors 26, 28 and 30 and the partial reflector 32 disposed in the longitudinal direction of the enclosure 10.

The laser beam 2 reflected by the total reflector 26 passes a first optical axis 20 and reaches the total reflector 28. Since the total reflector 28 is disposed slanting downward at an angle of $\theta$ relative to the first optical axis 20, the laser beam 2 passes a second optical axis 22 slanting downward at an angle of $2\theta$ with respect to the first optical axis 20 and reaches the total reflector 30. Since the total reflector 30 is disposed slanting upward at an angle of $\theta$ relative to the first optical axis 20, the laser beam 2 passes a third optical axis 24 parallel with the first optical axis 20 and reaches the partial reflector 32. Part of the laser beam 2 reaching the partial reflector 32 is output intact to the outside and the rest thereof returns to the total reflector 26 on an opposite route to the above. With this process repeated, the laser beam 2 is amplified while passing the excitation area 18 repeatedly, and at a proper energy level is output to the outside from the partial reflector 32.

The angle adjusting mechanism of the total reflector 28 will now be described with reference to FIGS. 24 and 25. The angle of the total reflector 28 installed on the adjusting plate 40 is adjusted by the adjustment of the angle of the adjusting plate 40. Since the adjusting plate 40 is pulled by the spring 55 toward the optical board 38 and is pushed back by the support 50 and two adjusting screws 46, the angle of the adjusting plate 40 is determined by a relationship between the length of the support 50 and the projection length of the adjusting screws 46 from the optical board 38. Namely, by turning the adjusting screws 46, the projection length thereof from the optical board 38 is changed, allowing the angle of the adjusting plate 40 to be adjusted up and down and/or side to side.

In the meantime, on receiving the laser beam 2, the total reflector 28 having a certain absorption factor for the laser beam 2 absorbs part of the laser beam 2 and generates heat. The total reflector 28 is indirectly cooled by the coolant 56 which cools the adjusting plate 40. The coolant 56 enters from the outside into the tube 58, passes the hole 51a in the optical board 38, then passes a hole formed in the adjusting plate 40, re-enters the hole 51b in the optical board 38, and finally goes out.

In terms of temperature, while the optical board 38 making direct contact with the coolant 56 depends on the coolant temperature, the optical base 36 depends on the ambient temperature. Accordingly, when a difference occurs between the coolant temperature and ambient temperature, a temperature difference is also produced between the optical board 38 and optical base 36. Since a linear expansion coefficient is different between the optical board 38 and optical base 36, thermal stress is generated therebetween. Generally, the optical base 36 is built very sturdily to support most of the components of the first or second laser beam reflecting means 12a or 12b. Hence, the thermal stress produced between the optical board 38 and optical base 36 causes distortion in the optical board 38.

When distortion occurs in the optical board 38 as described above, the angles of the adjusting plates 40 and 42 change, which forces the angles of the total reflector 28 and partial reflector 32 to change and the optical axes of the laser beam in the resonator to be misaligned, deteriorating the pointing (positional accuracy) stability of the laser beam.

The second optical axis 22 in FIG. 26 and the total reflectors 28 and 30 located at both ends of the second optical axis 22 will now be noted. Since the total reflector 28 slants downward at the angle of $\theta$ relative to the first optical axis 20 as described previously, the laser beam 2 reaches the total reflector 30 through the second optical axis 22 slanting downward at the angle of $2\theta$ relative to the first optical axis 20. Since the total reflector 30 slants upward at the angle of $\theta$ relative to the first optical axis 20, the laser beam 2 passes the third optical axis 24 parallel to the first optical axis 20. In other words, the second optical axis 22 slants at the angle of $2\theta$ relative to the first and third optical axes 20 and 24, and the reflective surfaces of the total reflectors 28 and 30 located at both ends of the second optical axis 22 are parallel to each other, slanting at the angle of $\theta$ relative to the first and third optical axes 20 and 24, respectively.

In such an arrangement, portions 34 and 35 where the reflective surfaces of the total reflectors 28 and 30 are opposed to each other occur in the openings of the apertures 15 and 16 as shown in FIG. 27. This causes a probability that parasitic oscillation 36 will be generated between portions 34 and 35 where the total reflectors 28 and 30 are opposed to each other, in addition to the ordinary laser oscillation. If this parasitic oscillation takes place, the beam mode of the laser beam 2 emitted by the laser oscillating apparatus will be faulty or the stability of the beam mode will be worsen.

The magnitude of beam mode control is determined by a ratio $\Phi/\omega$ (hereinafter referred to as the "beam mode control factor"); $\omega$ is $1/e^2$ radius in a single mode determined by resonator mirror curvature and resonator length (light path length from the total reflector 26 to the partial reflector 32), where e indicates the base of natural logarithm and $\Phi$ is an aperture diameter. In the single mode, an aperture having an approximately 3.1 to 3.4 beam mode control factor $\Phi/\omega$ is often selected as a controlling aperture value. Thus, as the beam mode control factor $\Phi/\omega$ becomes smaller, the degree of controlling the beam mode becomes higher.

In the conventional laser oscillating apparatus, the beam mode control factor $\Phi/\omega$ of one of four apertures 14 to 17 as shown in FIG. 18 is made lower than those of the other three apertures to prevent the occurrence of the parasitic oscillation 36. This is because the adjustment of the resonator mirrors will be difficult if the mode is controlled in many places. For instance, the apertures 14, 16 and 17 are set to the beam mode control factor $\Phi/\omega$ of 3.6, and only the aperture 15 is set to the beam mode control factor $\Phi/\omega$ of 3.2 for use as an aperture for controlling the single mode.

In this conventional arrangement, the adjustment of the resonator mirrors is comparatively simple because the beam mode is controlled at one place. However, since the laser beam 2 path is also controlled at one place, the optical path 24 of the laser beam 2 varies within a range where the aperture control is loose, leading to a inability to maintain the pointing stability of the laser beam 2.

The conventional laser oscillating apparatus arranged as described above will not have stabilized laser beam pointing.

SUMMARY OF THE INVENTION

It is accordingly an object of the present invention to overcome the disadvantages in the background art by providing a laser oscillating apparatus which has an excellent laser beam pointing stability.

The invention, as described herein, achieves a laser oscillating apparatus which is excellent in stability of the pointing of a laser beam because an optical board is heat-insulated from coolant.

The present invention achieves a laser oscillating apparatus which stabilizes a beam mode and is superior in stability of the pointing of a laser beam fetched. Two light paths, which are substantially parallel to each other, in the Z-shaped turning pattern of resonator light paths are designed to be skewed so that the effective surfaces of two total reflectors positioned at both ends of a slanting light path in the Z-pattern turning light paths are not opposed to each other.

The present invention achieves a laser oscillating apparatus that is outstanding in stability of the pointing of a laser beam. The beam mode control factors of two apertures respectively located immediately before two total reflectors positioned at both ends of a slanting light path in the Z-shaped turning pattern of resonator light paths are made smaller than those of the other apertures.

BRIEF DESCRIPTION OF THE DRAWINGS

FIG. 9 shows a second light path out of resonator light paths and resonator mirrors and apertures located at both ends of the second light path of a laser oscillating apparatus according to a preferred embodiment of the present invention.

FIG. 10 is a diagrammatic view illustrating the resonator light paths of a laser oscillating apparatus as the paths pass through the center of each aperture, according to a preferred embodiment of the present invention; right and left side views of the apertures are also illustrated.

DESCRIPTION OF THE PREFERRED EMBODIMENTS

Figure 22:
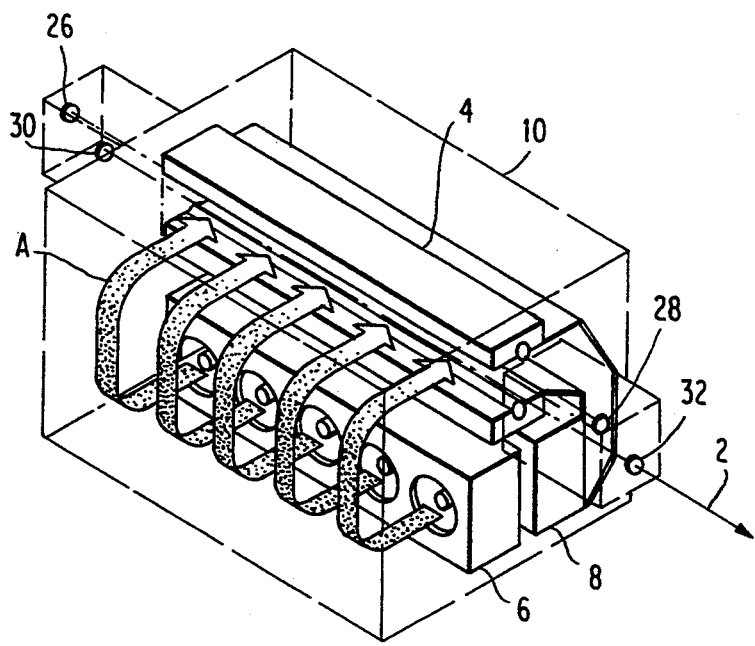
FIG. 22 is a perspective view illustrating the arrangement of the laser oscillating apparatus according to a preferred embodiment of the present invention and the conventional art.
Figure 23:
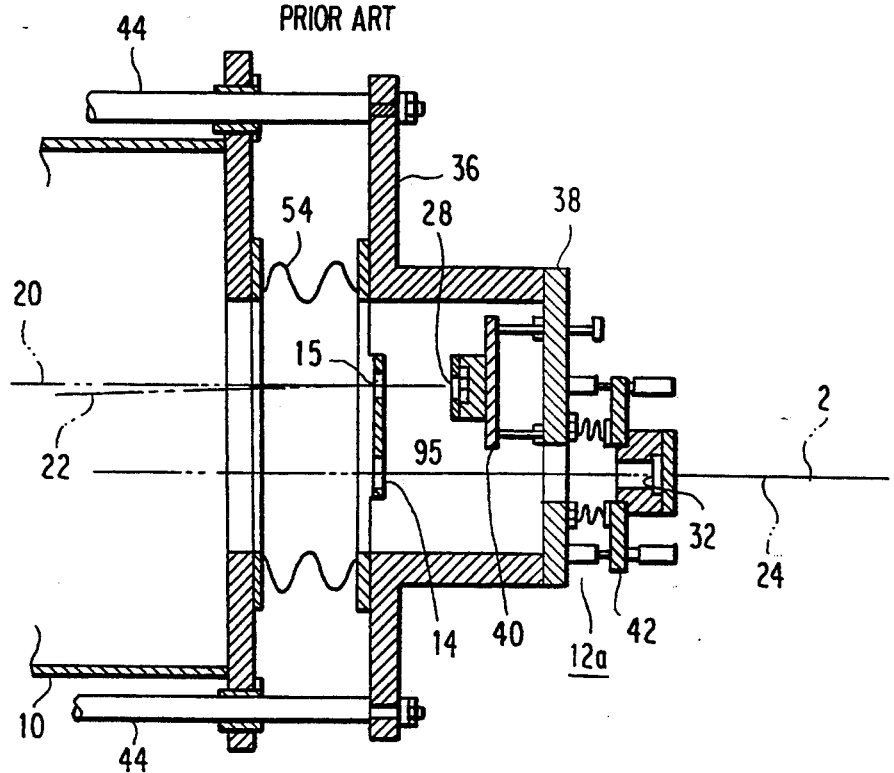
FIG. 23 is a sectional view of laser beam reflecting means of the laser oscillating apparatus according to a preferred embodiment of the present invention and the conventional art.
Figure 26:
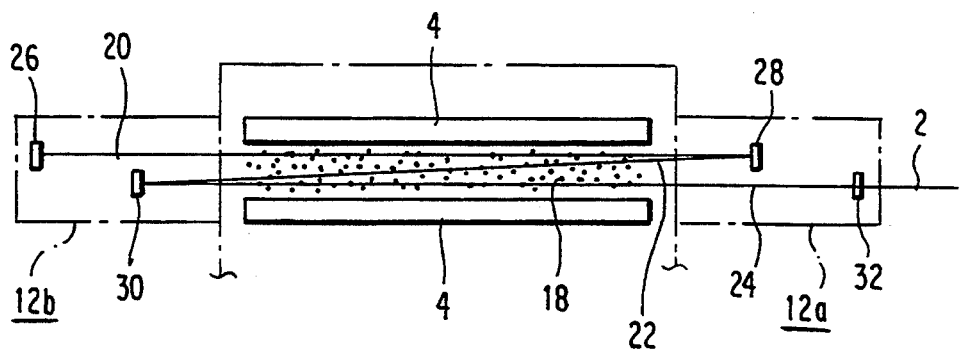
FIG. 26 is a vertical sectional diagrammatic view in the oscillating apparatus longitudinal direction including the resonator light paths of the laser oscillating apparatus according to a preferred embodiment of the present invention and the conventional art.
Figure 27:
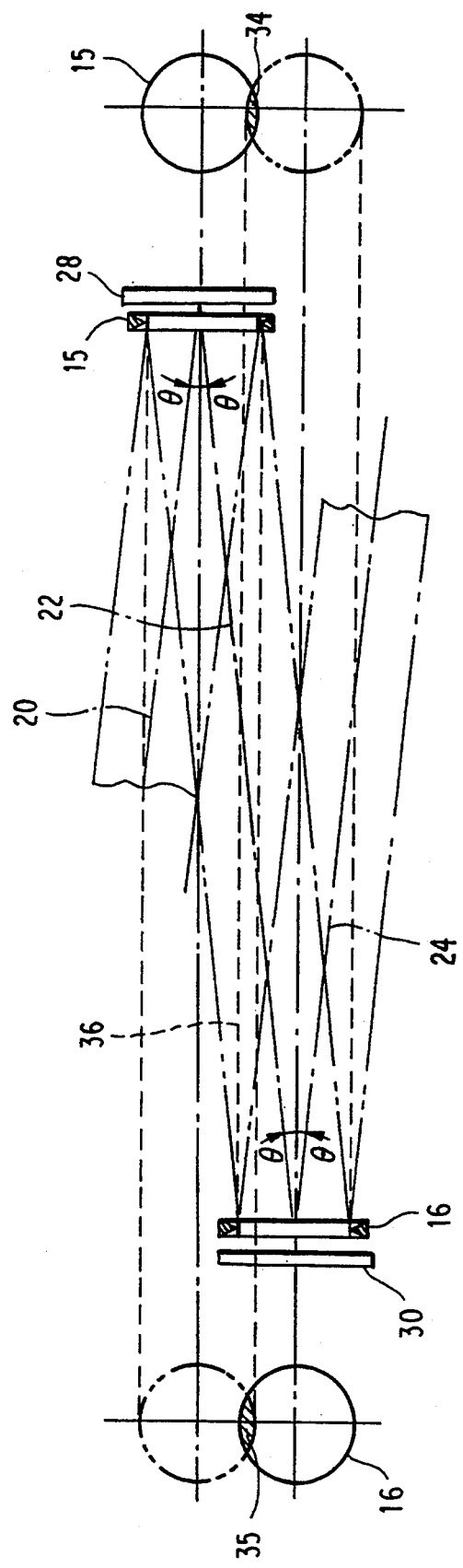
FIG. 27 illustrates a second light path among resonator light paths and resonator mirrors and apertures located at both ends of the second light path according to the laser oscillating apparatus of the conventional art.

An embodiment of the present invention will now be described with reference to the appended drawings. The perspective view illustrating the laser oscillating apparatus in FIG. 22, the sectional view of the laser beam reflecting means in FIG. 23, and the vertical sectional diagrammatic view in the longitudinal direction of the oscillating apparatus including the resonator light paths of the laser oscillating apparatus in FIG. 26 are identical to those of the conventional apparatus and will not be described here.

Figure 1:
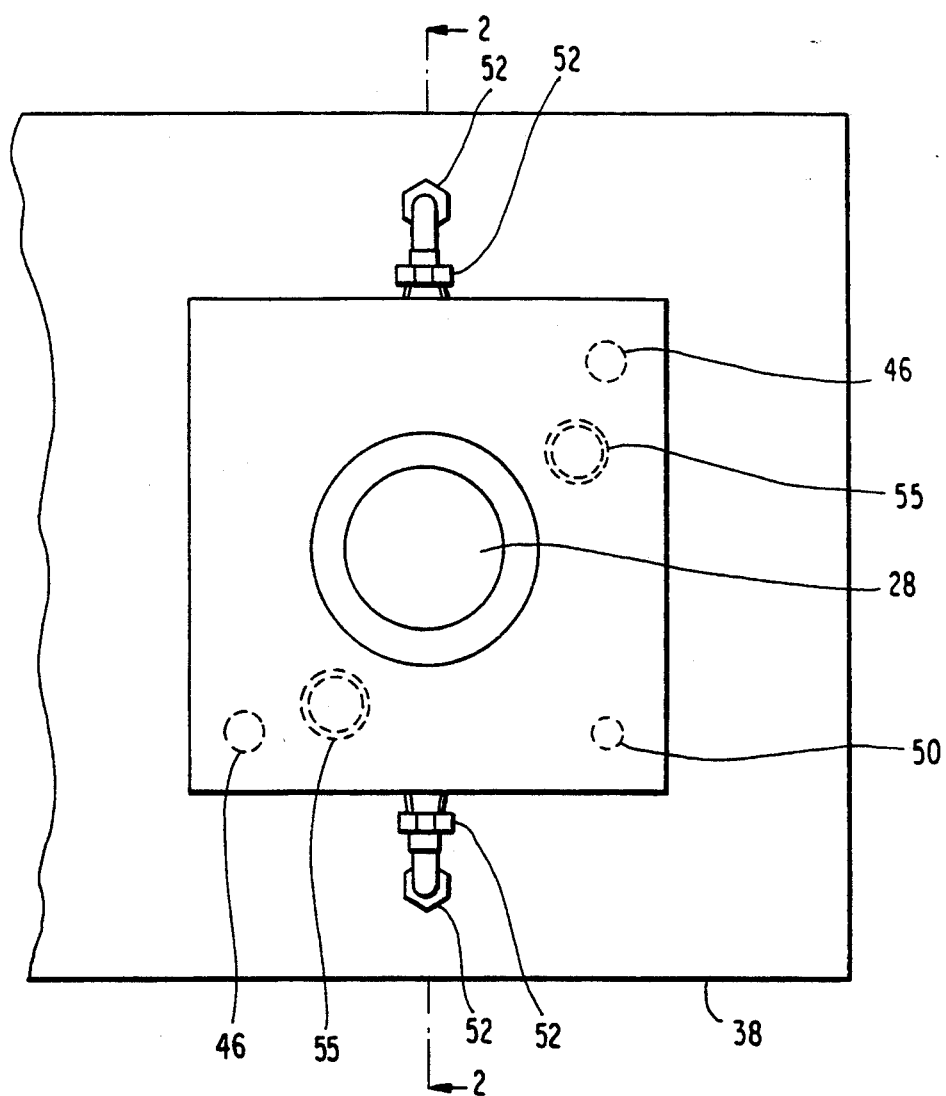
FIG. 1 is a diagrammatic view illustrating the angle adjusting mechanism of a laser oscillating apparatus according to a preferred embodiment of the present invention.
Figure 2:
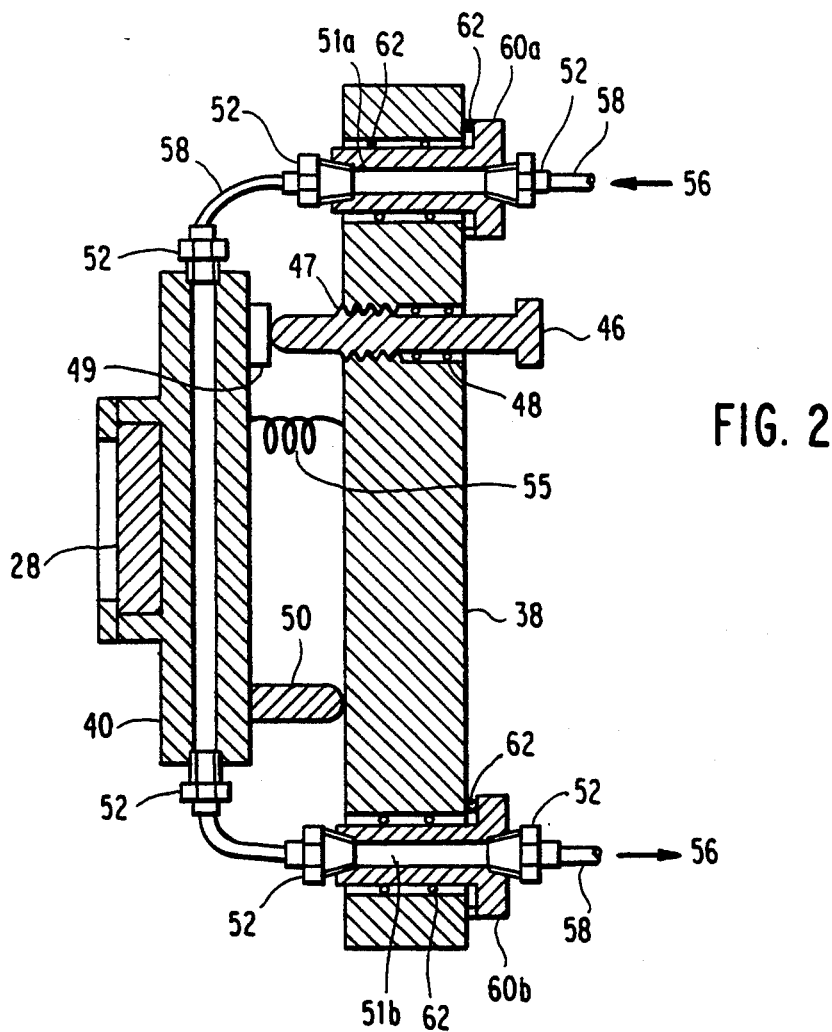
FIG. 2 is a sectional view taken along the plane 2—2 of FIG. 1.
Figure 24:
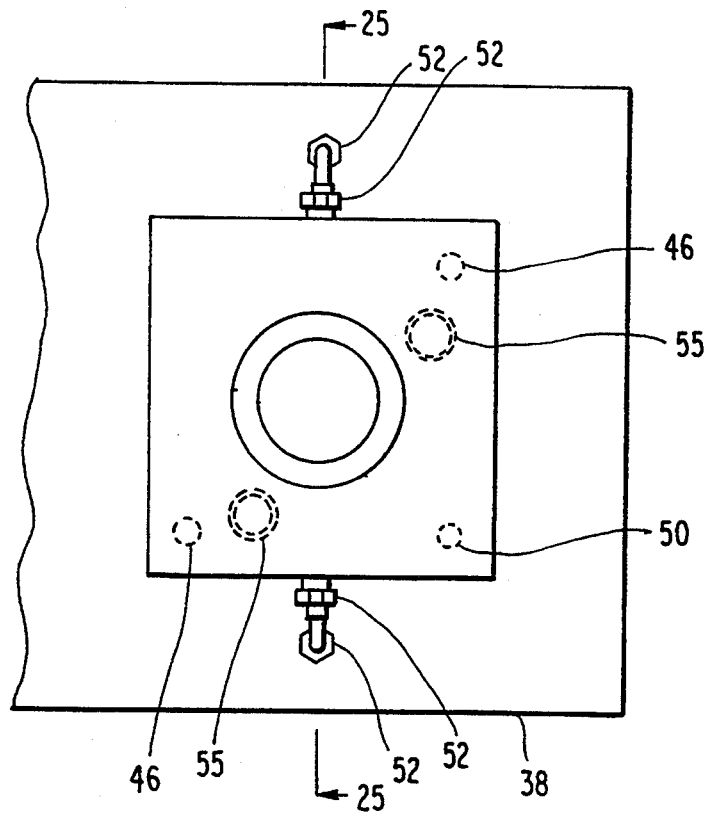
FIG. 24 is a diagrammatic view illustrating the angle adjusting mechanism of the laser oscillating apparatus of the conventional art.
Figure 25:
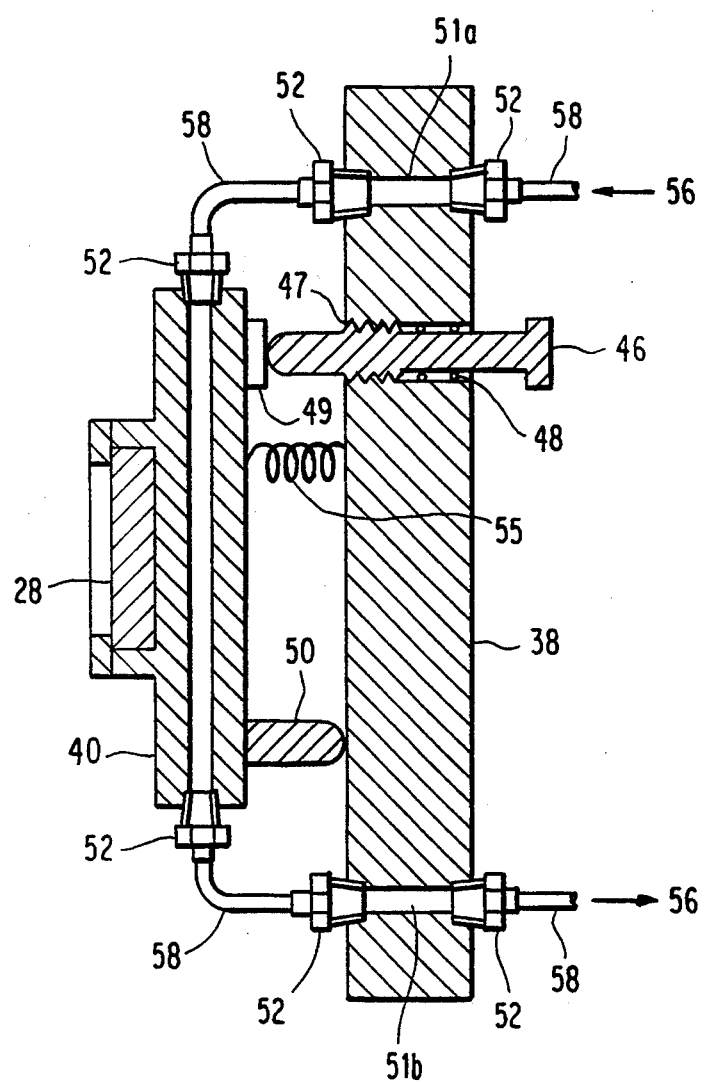
FIG. 25 is sectional view taken along the plane 25—25 of FIG. 24.

FIGS. 1 and 2 are diagrammatic views showing an angle adjusting mechanism of a laser oscillating apparatus in accordance with a first embodiment of the present invention. FIG. 1 is a side view and FIG. 2 is a sectional view taken along the plane 2—2 of FIG. 1. This first embodiment is different from the conventional laser oscillating apparatus shown in FIGS. 24 and 25 in that the holes 51a and 51b in which the coolant 56 passes are provided in second members 60a and 60b and that the second members 60a and 60b are installed on the optical board 38 via O rings 62.

According to the first embodiment, the coolant 56 flowing in the second members 60a, 60b is thermally making contact with the second members 60a, 60b. However, since the second members 60a, 60b are installed so as not to make direct contact with the optical board 38 by means of the O rings 62, the optical board 38 is thermally insulated from the second members 60a, 60b, and as a result, is heat-insulated from the coolant. In terms of temperature, therefore, the optical board 38 relies on the ambient temperature. Hence, if a difference takes place between the coolant temperature and ambient temperature, there will be no temperature difference between the optical board 38 and optical base 36, and distortion due to thermal stress between the optical board 38 and optical base 36 will not occur in the optical board 38, stabilizing the angles of the adjusting plates 40, 42. Accordingly, the pointing of the laser beam fetched will be excellent in stability.

Figure 3:
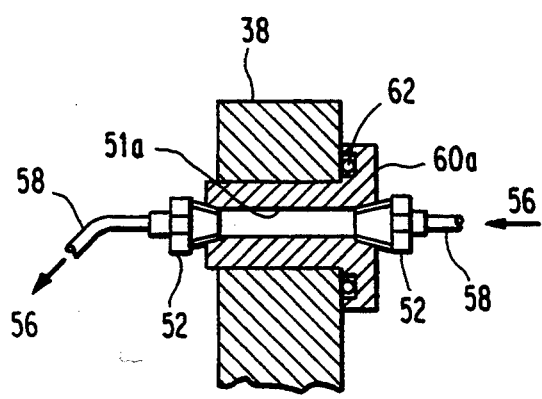
FIG. 3 illustrates the channel of coolant passing an optical board of a laser oscillating apparatus according to a preferred embodiment of the present invention.

A second embodiment of the present invention will now be described with reference to FIG. 3, which is a schematic diagram illustrating a channel of the coolant 56 passing the optical board 38 of a laser oscillating apparatus according to the present invention. As apparent from FIG. 3, the second member 60a is joined to the optical board 38 and the hole 51a in which the coolant 56 flows is provided in the second member 60a. 62 indicates an O ring for maintaining vacuum, and the second member 60a is made of an insulating member such as Teflon. The insulating member serves both as an electrically insulating material and as a thermally poor conductor, and the temperature of the coolant 56 flowing in the second member 60a rarely influences the temperature of the outer periphery of the second member 60a.

According to the second embodiment, the optical board 38 is heat-insulated from the coolant 56. Hence, the optical board 38 depends on the ambient temperature in terms of temperature, and if a difference occurs between the coolant temperature and ambient temperature, there will be no temperature difference between the optical board 38 and optical base 36, and distortion attributable to thermal stress between the optical board 38 and optical base 36 will not occur in the optical board 38, stabilizing the angles of the adjusting plates 40, 42. Therefore, the pointing of the laser beam fetched will be improved in stability.

Figure 4:
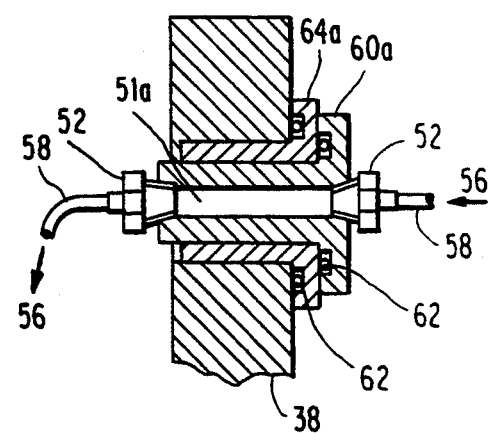
FIG. 4 illustrates the channel of coolant passing an optical board of a laser oscillating apparatus according to a preferred embodiment of the present invention.

A third embodiment of the present invention will now be described with reference to FIG. 4, which is a schematic diagram illustrating a channel of the coolant 56 passing the optical board 38 of a laser oscillating apparatus according to the third embodiment. The coolant 56 flows in the second member 60a, and a third member 64a is joined between the second member 60a and optical board 38. 62 indicates an O ring for maintaining vacuum. The third member 64a is made of an insulating member such as Teflon, and the second member 60a is made of metal for securing the threading strength of the joints 52 for the tubes 58. In this arrangement, the joints 52 can be made of a metal which is high in strength and reliability. Whereas the temperature of the coolant 56 flowing in the second member 60a influences the temperature of the outer periphery of the second member 60a, the temperature of the outer periphery of the second member 60a scarcely affects the temperature of the outer periphery of the third member 64a which is a thermally poor conductor. According to the third embodiment, the optical board 38 is thermally insulated from the coolant 56, stabilizing the angles of the adjusting plates 40, 42. Hence, the pointing of the laser beam fetched will be enhanced in stability.

Figure 5:
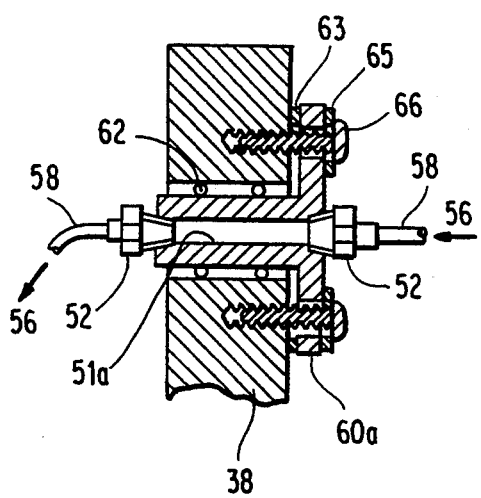
FIG. 5 illustrates the channel of coolant passing an optical board of a laser oscillating apparatus according to a preferred embodiment of the present invention.

A fourth embodiment of the present invention will now be described with reference to FIG. 5, which is a schematic diagram illustrating a channel of the coolant 56 passing the optical board 38 of a laser oscillating apparatus according to the fourth embodiment. Referring to FIG. 5, the hole 51a where the coolant 56 flows is provided in the second member 60a, and the second member 60a is joined to the optical board 38 by a screw 66 and a washer 65 which is made of a heat insulating member. A spacer 63 made of an insulating member is inserted between the optical board 38 and second member 60a. 62 indicates an O ring for maintaining vacuum, and the second member 60a is made of a member, such as a metal, which is high in strength and reliability.

According to the fourth embodiment, the coolant 56 flows in the second members 60a, 60b and is thermally making contact with the second members 60a, 60b. However, the outer peripheries of the second members 60a, 60b are installed so as not to make direct contact with the optical board 38 by means of the O rings 62, and the portions where the second members 60a, 60b are fastened to the optical board 38 are built so as not to make direct contact with the optical board 38 by means of the spacers 63 made of insulating members. While heat is transmitted from the optical board 38 through the screws 66 which are used for installation to the optical board 38, heat insulation is provided between the optical board 38 and second members 60a, 60b by the washers 65 made of heat insulating members. Hence, the optical board 38 is heat-insulated from the second members 60a, 60b, and as a result, is heat-insulated from the coolant 56.

It should be noted in the fourth embodiment that an identical effect is produced without the washers 65 if the screws 66 are made of insulating members.

Figure 6:
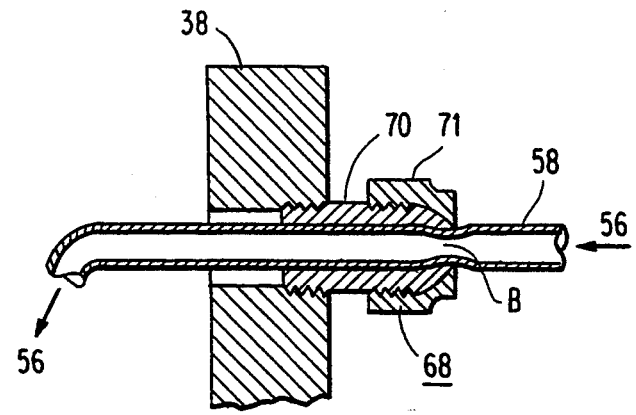
FIG. 6 illustrates the channel of coolant passing an optical board of a laser oscillating apparatus according to a preferred embodiment of the present invention.

A fifth embodiment of the present invention will now be described with reference to FIG. 6, which is a schematic diagram illustrating a channel of the coolant 56 passing the optical board 38 of a laser oscillating apparatus according to the fifth embodiment. The coolant 56 passes the optical board 38 through the tube 58. The tube 58 is fixed at portion B by a fourth structural member 68 made of a joint-shaped heat-insulating material, which has been screwed and secured in the optical board 38, and is also held so as not to make contact with the optical board 38. A Teflon tube joint may be taken as an example of the fourth structural member 68. A body 70 of the fourth structural member 68 is threaded and fixed in the optical board 38, and the tube 58 can be locked by tightening a nut 71.

According to the fifth embodiment, heat is transmitted to the tube 58 when the temperature of the coolant 56 changes. However, since the tube 58 is not in contact with the optical board 38, heat is transmitted from the portion B to the optical board 38 via the fourth structural member 68 made of the joint-shaped insulating material. Because the fourth structural member 68 is made of the heat insulating material, the optical board 38 is heat-insulated from the coolant 56. Hence, the optical board 38 is at the ambient temperature, and if a difference occurs between the coolant temperature and ambient temperature, there will be no temperature difference between the optical board 38 and optical base 36, and distortion caused by thermal stress between the optical board 38 and optical base 36 will not occur in the optical board 38, keeping the angles of the adjusting plates 40, 42 unchanged. Therefore, the pointing of the laser beam fetched will be upgraded in stability.

A sixth embodiment of the present invention will now be described with reference to the appended drawings. This embodiment prevents parasitic oscillation and provides a laser oscillating apparatus designed to stabilize the beam mode of a laser beam and to provide enhanced pointing stability of the laser beam.

Figure 7:
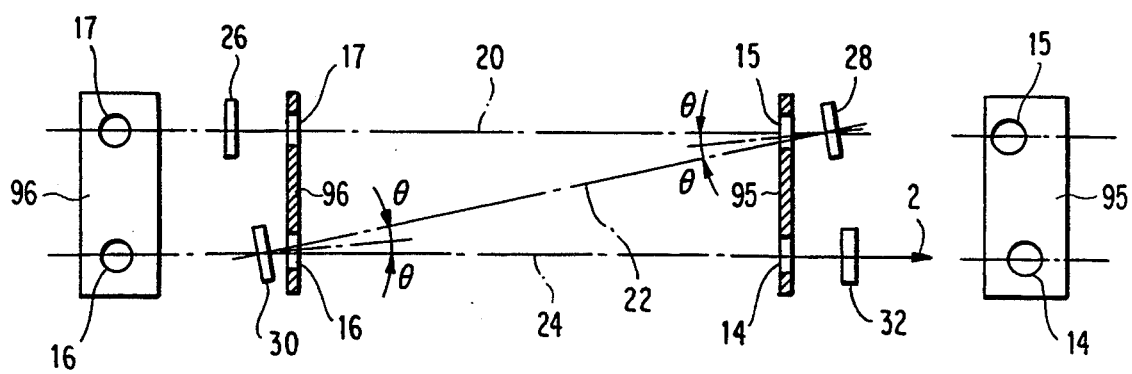
FIG. 7 is a diagrammatic view illustrating the resonator light paths of a laser oscillating apparatus as the paths pass through the center of each aperture, according to a preferred embodiment of the present invention; right and left side views of the apertures are also illustrated.
Figure 8:
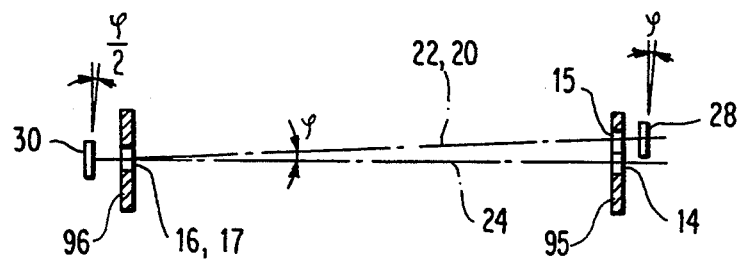
FIG. 8 is a bottom view of FIG. 7.

FIGS. 7 and 8 are diagrammatic views illustrating the resonator light paths of a laser oscillating apparatus according to the sixth embodiment of the present invention. FIG. 7 is a sectional view as seen from the front and FIG. 8 is a bottom view thereof. The laser oscillating apparatus according to the present embodiment is different from the conventional design in that the aperture 15 does not exist in the plane of FIG. 7 but is located slightly in front of that plane. The offset of the beam locus by an angle $\phi$, requiring mirror 28 to be offset to the normal by the same angle $\phi$ and mirror 30 to be offset by $\phi/2$ is illustrated in FIG. 8. As a result, the first optical axis 20 and third optical axis 24 are substantially parallel but are skewed, as can be seen from FIGS. 7 and 8. Portions where the reflective surfaces of the total reflectors 28 and 30 are opposed to each other do not exist in the openings of the apertures 15, 16 as shown in FIG. 9, thereby eliminating the probability that parasitic oscillation will take place. As seen in the Figure, the broken lines between 14 and 15 (which are disposed in aperture member 95) represent the projection from mirror 30 while the broken line between apertures 16 and 17 (which are disposed in aperture member 96) represents the projection from mirror 28. The absence of any overlap of the projection into the apertures provides a laser oscillating apparatus which ensures excellence in pointing stability of a laser beam.

There may be many other arrangements which allow the portions where the reflective surfaces of the total reflectors 28 and 30 are opposed to each other and have the openings of the apertures 15, 16 displaced, thereby eliminating the probability of the occurrence of parasitic oscillation.

Figure 11:
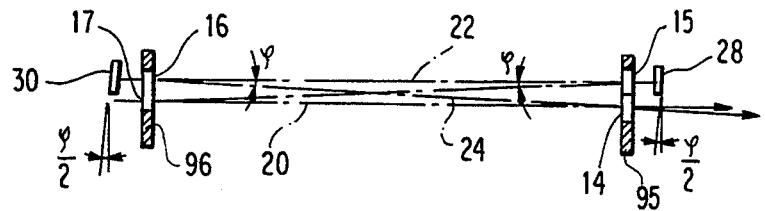
FIG. 11 is a bottom view of FIG. 10.

For example, FIGS. 10 and 11 are diagrammatic views showing the resonator light paths of a laser oscillating apparatus according to a seventh embodiment of the present invention. FIG. 10 is a sectional view as seen from the front and FIG. 11 is a bottom view thereof. The laser oscillating apparatus according to the present embodiment is different from the conventional design in that the apertures 15 and 16 do not exist in the plane of FIG. 10 but the aperture 15 is located in front of that plane and the aperture 16 in the back of that plane. FIG. 10 indicates the difference from FIG. 8 as an offset of the mirror 28 by only $\phi/2$, thereby resulting in an angle of beam 20 with beams 22 and 24 of $\phi$. Accordingly, the first optical axis 20 and third optical axis 24 are substantially parallel but skewed, and portions where the reflective surfaces of the total reflectors 28 and 30 are opposed to each other do not exist in the openings of the apertures 15, 16 as shown in FIG. 9, eliminating the probability that parasitic oscillation will occur. This provides a laser oscillating apparatus which has excellent pointing stability for the laser beam generated.

Figure 12:
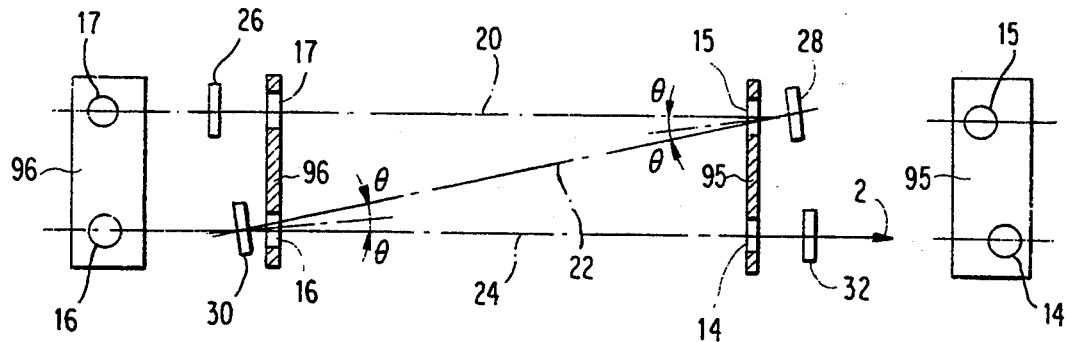
FIG. 12 is a diagrammatic view illustrating the resonator light paths of a laser oscillating apparatus as the paths pass through the center of each aperture, according to a preferred embodiment of the present invention; right and left side views of the apertures are also illustrated.
Figure 13:
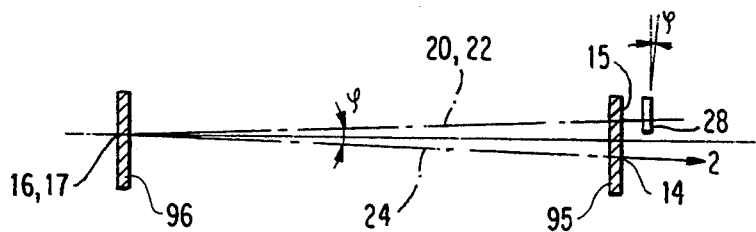
FIG. 13 is a bottom view of FIG. 12.

FIGS. 12 and 13 are diagrammatic views illustrating the resonator light paths of a laser oscillating apparatus according to an eighth embodiment of the present invention. FIG. 12 is a sectional view as seen from the front and FIG. 13 is a bottom view thereof. The laser oscillating apparatus according to the present embodiment is different from the one known in the art in that the apertures 14 and 15 do not exist in the plane of FIG. 12 but the aperture 15 is located in front of that plane and the aperture 14 in the rear of that plane. Hence, the first optical axis 20 and third optical axis 24 are substantially parallel but skewed, and portions where the reflective surfaces of the total reflectors 28 and 30 are opposed to each other do not exist in the openings of the apertures 15, 16 as shown in FIG. 9, eliminating the probability that parasitic oscillation will be generated. This provides a laser oscillating apparatus which has improved pointing stability of the laser beam.

Figure 14:
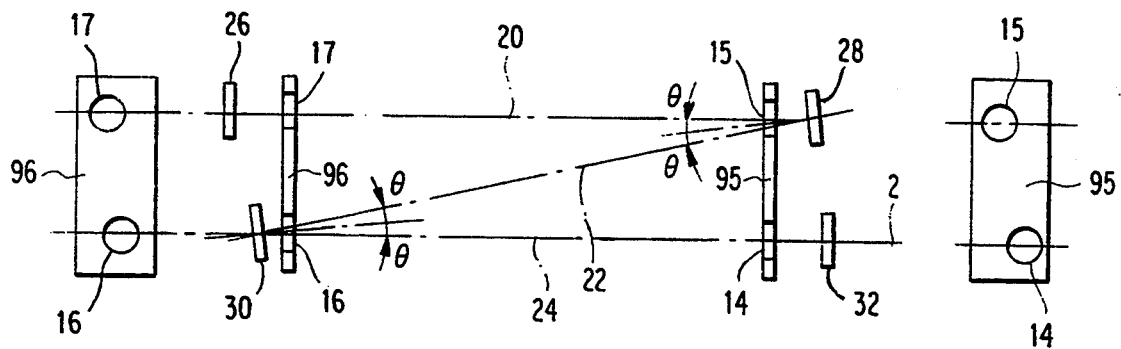
FIG. 14 is a diagrammatic view illustrating the resonator light paths of a laser oscillating apparatus as the paths pass through the center of each aperture, according to a preferred embodiment of the present invention; right and left side views of the apertures are also illustrated.
Figure 15:
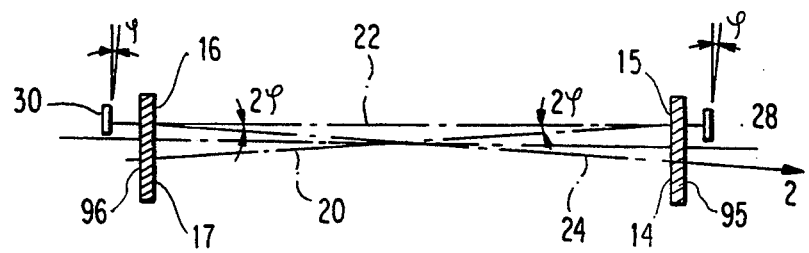
FIG. 15 is a bottom view of FIG. 14.

FIGS. 14 and 15 are diagrammatic views showing the resonator light paths of a laser oscillating apparatus according to a ninth embodiment of the present invention. FIG. 14 is a sectional view as seen from the front and FIG. 15 is a bottom view thereof. The laser oscillating apparatus in accordance with the present embodiment is different from the one according to the background art in that the apertures 14, 15, 16 and 17 do not exist in the plane of FIG. 14 but the apertures 15 and 17 are located in front of that plane and the apertures 14 and 16 in the rear of that plane. As seen in FIG. 15, reflectors 28 and 30 are angled by $\phi$ and the beams 20 and 24 each make an angle of $2\phi$ with beam 22. Therefore, the first optical axis 20 and third optical axis 24 are substantially parallel but skewed, and portions where the reflective surfaces of the total reflectors 28 and 30 are opposed to each other do not exist in the openings of the apertures 15, 16 as shown in FIG. 9, eliminating the probability that parasitic oscillation will be produced. This provides a laser oscillating apparatus which has an enhanced pointing stability for the laser beam.

Figure 16:
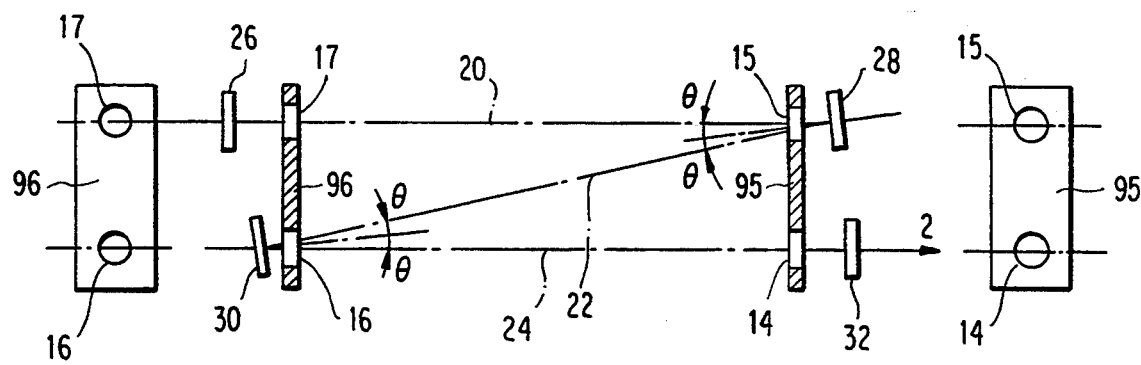
FIG. 16 illustrates the resonator arrangement of a laser oscillating apparatus as the paths pass through the center of each aperture, according to a preferred embodiment of the present invention; right and left side views of the apertures are also illustrated.
Figure 17:
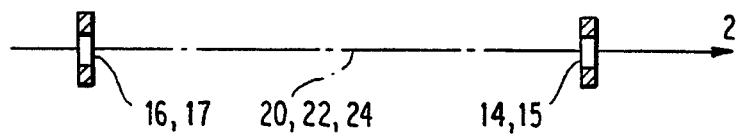
FIG. 17 is a bottom view of FIG. 16.

The resonator arrangement of a laser oscillating apparatus according to a tenth embodiment of the present invention will now be described with reference to FIGS. 16 and 17. FIG. 16 is a sectional view as seen from the front and FIG. 17 is a bottom view thereof. In the laser oscillating apparatus in accordance with the present embodiment, the beam mode control factors $\Phi/\omega$ of the two apertures 15, 16 respectively located immediately before the two total reflectors 28, 30 positioned at both ends of the slanting light path 22 among the Z-pattern turning light paths in the four apertures are made smaller than the beam mode control factors $\Phi/\omega$ of the other two apertures. For instance, the beam mode control factors $\Phi/\omega$ of the apertures 14, 17 are set to 3.6, that of the aperture 15 to 3.2 for use as an aperture for controlling a single mode, and that of the aperture 16 to 3.3. These apertures 15, 16 specify the position of the inclined light path. In such an arrangement where two places are controlled severely by the apertures 15, 16, the optical axis 24 of the laser beam 2 is fixed, thereby maintaining the stability of the pointing of the laser beam 2. This will now be described in further detail.

Figure 18:
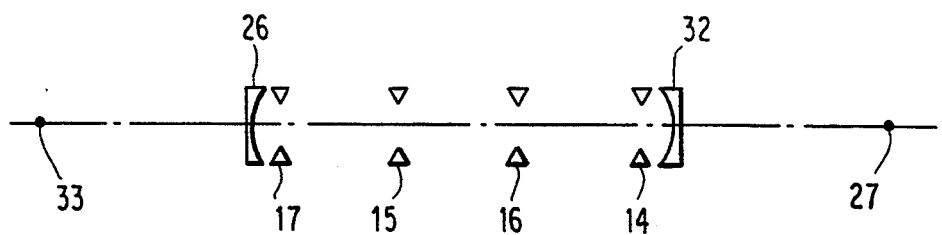
FIG. 18 illustrates how the oscillation optical axes of the resonator change in the laser oscillating apparatus according to a embodiment of the present invention.
Figure 19:
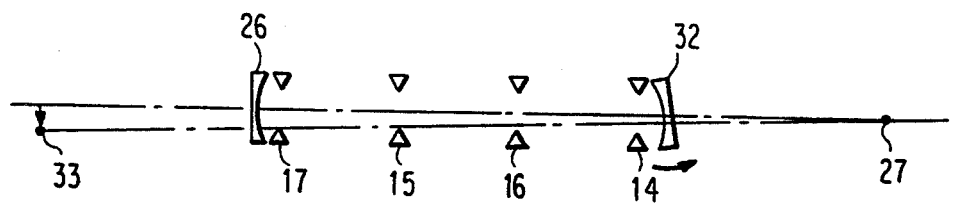
FIG. 19 illustrates how the oscillation optical axes of the resonator change in the laser oscillating apparatus according to an embodiment of the present invention.
Figure 20:
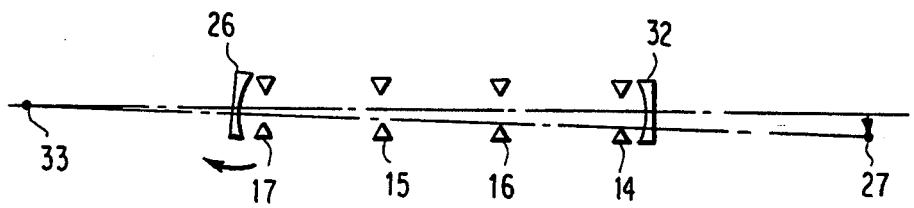
FIG. 20 illustrates how the oscillation optical axes of the resonator change in the laser oscillating apparatus according to an embodiment of the present invention.

FIGS. 18 to 20 illustrate how the oscillation optical axes of the resonator change. In respective views, the Z-pattern resonator light paths are diagrammatically represented on a straight line. Points 33 and 27 are the curvature centers of the partial reflector 32 and total reflector 26, respectively, and the optical axis of the laser beam 2 at the time of laser oscillation matches a straight line connecting the curvature centers 33 and 27 of the partial reflector 32 and total reflector 26. FIG. 18 shows an initial state and FIG. 19 illustrates a state wherein the angle of, for example, the partial reflector 32 has shifted. Since the angle of the partial reflector 32 has shifted, the curvature center 33 of the partial reflector 32 changes as shown in FIG. 19. In this case, the movement of the optical axis of the laser beam 2 on the apertures 15 and 16 are smaller than that on the aperture 17. A state wherein the angle of the total reflector 26 has shifted will now be described with reference to FIG. 20. Since the angle of the total reflector 26 has shifted, the curvature center 27 of the total reflector 26 changes as shown in FIG. 20. In this case, the movement of the optical axis of the laser beam 2 on the apertures 15 and 16 are smaller than that on the aperture 14. Accordingly, it is understood that the apertures 15, 16 are more tolerant toward the angle shift of the resonator mirrors than the apertures 17 and 14. By placing apertures having smaller $\Phi/\omega$ beam mode control factors in the positions of the apertures 15 and 16, the pointing of the laser beam 2 can be stabilized with almost no difficulty in adjusting the resonator mirrors.

Figure 21:
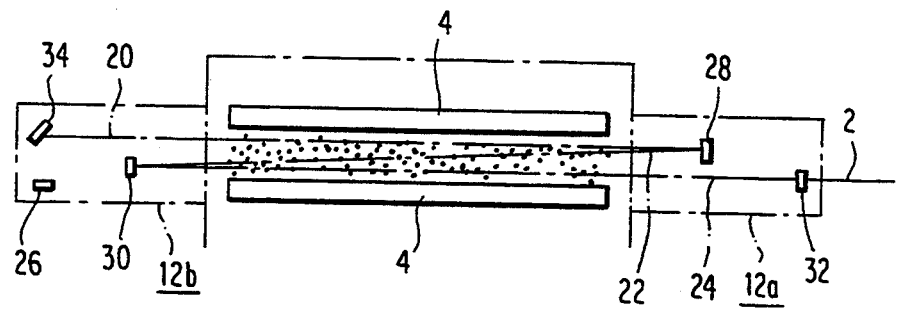
FIG. 21 is a vertical sectional diagrammatic view in an oscillating apparatus longitudinal direction including the resonator light paths of a laser oscillating apparatus according to a preferred embodiment of the present invention and the conventional art.

The resonator light paths are not limited to the Z pattern as described in the embodiment and may include a Z-shaped turning pattern. For instance, resonator light paths having additional total reflectors 26 and 34 as shown in FIG. 21 will also produce an identical effect.

What is claimed is:

1. A laser oscillating apparatus for outputting a stabilized laser beam by exciting a laser medium and transmitting said laser along defined beam paths, comprising:
    a first plurality of resonator mirrors constituting a resonator;
    a second plurality of adjusting members for adjusting the angles of said resonator mirrors and defining said beam paths;
    an optical board mounted with said adjusting members;
    at least one coolant channel for carrying coolant; and
    a heat insulation member, provided between said at least one coolant channel and said optical board, for heat insulating said optical board from said coolant.

2. The laser oscillating apparatus, as set forth in claim 1, wherein said heat insulating members have holes comprising said cooling channels, said heat insulating members being installed in said optical board so as to avoid direct thermal contact with said board.

3. The laser oscillating apparatus, as set forth in claim 1, wherein said heat members are installed in said optical board with insulating material therebetween.

4. A laser oscillating apparatus for outputting a stabilized laser beam by exciting a laser medium and transmitting said laser beam along defined beam paths within a resonator comprising:
    a plurality of resonator mirrors comprising a partial reflector and total reflectors for defining said beam paths, at least a first and second of said reflectors being disposed at opposite ends of said resonator and being disposed so that said resonator beam paths have a Z-shaped turning pattern, said resonator mirrors each being independently adjustable, wherein two light paths in said Z-shaped turning pattern of the resonator beam paths are skewed.

5. The laser oscillating apparatus for outputting a laser beam by exciting a laser medium, as set forth in claim 4, further comprising:

a plurality of apertures, at least a first and second of said apertures being in an aperture member disposed proximate to a corresponding one of said first and second reflectors and between said first and second reflectors along one of said beam paths.

6. The laser oscillating apparatus for outputting a laser beam by exciting a laser medium, as set forth in claim 5, wherein said first and second reflectors are oppositely disposed and a projection of said first reflector toward said second reflector is substantially blocked from passing through the corresponding second aperture of said second reflector.

7. The laser oscillating apparatus for outputting a laser beam by exciting a laser medium, as set forth in claim 5, wherein said parallel beams are disposed in a plane comprising said first and second reflectors and at least one of said first and second apertures are disposed at a position orthogonal to said plane.

8. The laser oscillating apparatus, as set forth in claim 7, wherein said first and second apertures are disposed at a position orthogonal to said plane.

9. A laser oscillating apparatus for outputting a laser beam by exciting a laser medium within a resonator, comprising:

a plurality of resonator mirrors comprising at least a partial reflector and first and second total reflectors for determining resonator light paths and disposed so that said resonator light paths have a Z-shaped turning pattern with said first and second reflectors being oppositely disposed along said pattern;

a plurality of apertures, comprising at least a first and second aperture, disposed in an aperture member opposite a corresponding one of said reflectors for selecting a beam mode; and wherein beam mode control factors of said first and second apertures, which are respectively located along said Z-shaped turning pattern and immediately before said first and second total reflectors positioned at both ends of a slanting light path in said Z-shaped turning pattern, are made smaller than the beam mode control factors of others of said plurality of apertures.

10. The laser oscillating apparatus for outputting a laser beam by exciting a laser medium, as set forth in claim 9, wherein said beam mode control factor is represented by $\Phi/\omega$, where $\Phi$ is an aperture diameter and $\omega$ is $1/e^2$ radius in a single mode determined by resonator mirror curvature and resonator length and e indicates the base of a natural logarithm.

11. The laser oscillating apparatus for outputting a laser beam by exciting a laser medium, as set forth in claim 9 wherein, said aperture sizes are selected to substantially prevent parasitic oscillations.

12. The laser oscillating apparatus for outputting a laser beam by exciting a laser medium, as set forth in claim 9, wherein at least said partial reflector and said first and second reflectors have a center of curvature and the angles of at least one of said reflectors to a common reference is different from the angles of other of said reflectors so as to shift the optical center of curvature for said at least one reflector.

* * * * *